Patented Mar. 28, 1944

2,345,506

UNITED STATES PATENT OFFICE 2,345,506

REGENERATION OF SPENT ALKYLATION ACIDS

Ober C. Slotterbeck, Rahway, N. J., assignor to Standard Oil Development Company, a corporation of Delaware No Drawing. Application August 10, 1940, Serial No. 352,131

3 Claims. (Cl. 23—172)

This invention relates to the purification and reconcentration of sulfuric acid that has been used as a catalyst in the condensation of saturated, branched-chain hydrocarbons with olefins.

In the condensation of isoparaffins with olefins using sulfuric acid as a catalyst, acid of approximately 90 to 100% concentration is most effective. This acid acts solely as a catalyst in the condensation reaction. Consequently, no loss of acid is caused by the condensation reaction itself. However, certain side reactions take place in which some of the acid reacts with some of the hydrocarbons. The products of these side reactions, usually sulfonic acids, sulfur-containing acid esters, or other sulfur-containing carbonaceous compounds, are soluble in the sulfuric acid catalyst, and the catalytic activity of the acid decreases as the amount of the sulfur-containing carbonaceous material dissolved therein increases. When the quantity of this dissolved sulfur-containing carbonaceous material amounts to approximately 10% or more by weight of the total acid phase, the catalyst activity is reduced to such an extent that the catalyst must be replaced with fresh concentrated sulfuric acid. Water present in the feed stocks or produced in the side reactions also tends to dilute the acid phase and thereby reduce the catalytic activity.

One of the general methods used heretofore for the recovery of sulfuric acid from mixtures of sulfuric acid and carbonaceous material involves heating coke to a high temperature by direct contact with air and hot flue gas in a horizontal rotary drum. This hot coke is then conducted continuously to a second horizontal rotary drum, located at a lower level, to which the mixture of sulfuric acid and carbonaceous material is added. In this drum, the sulfuric acid is essentially completely reduced to $SO_2$ and water vapor by the carbonaceous matter present. Part of the carbonaceous matter in the spent acid is converted to coke. This coke, together with the remainder of the original coke, is withdrawn from the conversion drum, and part of the coke is recycled to the coke heating step. Normally, when refinery sludge acid is treated by this method, more coke is withdrawn from the conversion drum than was charged to it. The gases from the sludge conversion step are kept separate from the flue gases from the coke heating kiln. The impure $SO_2$ gas from the sludge conversion step is purified, and then converted into $SO_3$ in the standard-type contact plant. The $SO_3$ is then absorbed in sulfuric acid in the usual manner to bring the acidity up to the required concentration. An acid recovery of 88 to 90% is obtained by this method.

The spent alkylation acid that is to be purified and reconcentrated according to this invention generally contains less than 90% by weight of free sulfuric acid, the remainder being sulfonic acids, polymer, other organic compounds which have not been fully identified, and water. The total carbon content is from 2 to 20%. In order to recover sulfuric acid from spent alkylation acid by the above method, it would be necessary to incorporate extraneous carbonaceous matter in the spent acid, as spent alkylation acid has a relatively low carbon content. The main objection is that the equipment required is expensive and unless large quantities of acid are to be recovered the cost of recovery is too high to be commercially practical.

A method that has been used heretofore for the recovery of sulfuric acid from spent alkylation acids involves oxidizing the organic impurities present in a spent alkylation acid by means of nitric acid. The spent alkylation acid is treated with about 400 pounds of nitric acid per ton of spent acid. The water formed by oxidation of the organic impurities dilutes the sulfuric acid to approximately 65 to 78% concentration; this diluted acid is concentrated up to 94 to 95% acid in a vacuum concentrator, and the latter acid is fortified with $SO_3$ up to 98% acid. The nitrogen oxides produced in this process are subsequently converted into nitric acid. Even if 90% of the nitric acid could be recovered and recycled, the cost of making up for the nitric acid consumed in this process would be relatively high.

Another method that has been used heretofore is that of diluting the acid to obtain a separation of the organic material present, such as, the polymer, carbon, etc., and reconcentrating the dilute acid after the separation of the organic material. The difficulty encountered in following this method is that colloidal coke is formed during the reconcentration of the dilute acid obtained from the spent alkylation sulfuric acid.

An object of this invention is to purify and reconcentrate the spent alkylation sulfuric acid so that no colloidal coke is formed during the reconcentration.

Another object of this invention is to restore the catalytic activity of spent alkylation sulfuric acid.

According to this invention, the spent alkylation sulfuric acid of less than 90% concentration is diluted with water to obtain a 40 to 60% concentration of sulfuric acid. The diluted alkylation sulfuric acid is then heated to a temperature below the boiling point of the diluted sulfuric acid and above the boiling point of water, such as 120° C. to 170° C., and blown with air and steam for one-half to two hours with or without mechanical agitation. The mixture is allowed to settle and a layer separation is obtained, one layer containing the dilute sulfuric acid and the other containing flocculent carbon. The dilute sulfuric acid layer is reconcentrated by heating under vacuum to 85% to 95% concentration of sulfuric acid. The reconcentrated acid is then fortified by the addition of $SO_3$ to a 98% concentration of sulfuric acid.

Alternatively, the water may be introduced to dilute the spent alkylation sulfuric acid by blowing with steam and regulating the heating until a dilute sulfuric acid of 45° Bé gravity is obtained. The heating is continued and the diluted sulfuric acid is blown with steam and air for one-half to two hours to obtain a flocculent carbon formation. The purified acid is then reconcentrated according to the method detailed above.

The following examples illustrate the beneficial results which can be obtained by purifying and reconcentrating spent alkylation acids according to the process of this invention.

A sample (1) of spent sulfuric acid was drawn from the reactor in a pilot-scale alkylation run in which isobutane was being alkylated with the olefins in a refinery $C_4$ cut at 70° F.; the sulfuric acid replacement amounted to 0.5 pound of acid per gallon of hydrocarbon per hour. The sample was taken at the time that the alkylate yield had decreased to 110 volume per cent from a maximum of 170 volume per cent. The following analytical results were obtained on this sample:

|  | Weight percent as $H_2SO_4$ | Weight percent on total acid |
|---|---|---|
| Titratable acid | 69.7 |  |
| Total acidity | 70.4 |  |
| Free $H_2SO_4$ | 65.8 |  |
| Combined acid | ¹ 4.4 |  |
| $SO_2$ | 0.3 |  |
| $H_2O$ |  | 6.5 |
| Polymer |  | 14.7 |
| Carbon |  | 15.24 |
| Ash |  |  |

¹ Or 3.1 calc. as butyl sulfonic acid.

This spent alkylation acid was used in a series of runs on the alkylation of isobutane with isobutene: in run (A), it was used as such; for run (B), it was previously fortified with $SO_3$ to a 98% sulfuric acid concentration; and, prior to run (C), the diluted spent acid was regenerated with a steam and air treat, and the purified acid was vacuum-concentrated and fortified with $SO_3$ to a 98% sulfuric acid concentration; and in (D), fresh concentrated sulfuric acid was used as the catalyst. The data for these runs are given in the following table:

Another sample (II) of alkylation acid that was withdrawn from an alkylation reactor during the 37 to 60 hour period of a run made at 110° F. with a feed containing 13.9% of unsaturates and 60% of isobutane had the following analysis:

|  | Weight per cent as $H_2SO_4$ | Weight per cent on total acid |
|---|---|---|
| Titratable acid | 79.2 |  |
| Total acidity | 79.5 |  |
| Free $H_2SO_4$ | 75.7 |  |
| Combined acids | ¹ 5.6 |  |
| $SO_2$ | 1.0 |  |
| $H_2O$ |  | 4.5 |
| Polymer |  | 7.9 |
| Carbon |  | 9.45 |
| Ash |  | 0.3 |

¹ Or 4% calc. as butyl sulfonic acid.

This acid was used, both before and after its treatment according to the method of this invention, as the catalyst for alkylation runs carried out as indicated in the preceding table. The pertinent data, showing the improved results obtained with the treated acid, follow:

*Alkylation data*

| Used acid | | Treated acid | |
|---|---|---|---|
| Weight per cent alkylate yield | Bromine No. of product | Weight per cent alkylate yield | Bromine No. of product |
| 116 | 21.7 | 149.5 | 0.1 |

From the above results, it is obvious that the use of an acid, regenerated according to the method of this invention, as a catalyst for the alkylation of an isoparaffin with an olefin enables the obtainment of better yields of alkylates having lower bromine numbers than are obtainable in the case of the corresponding spent acid, the corresponding spent acid fortified with $SO_3$ in the usual way, or fresh, concentrated sulfuric acid.

I claim:

1. In the regeneration of spent alkylation acids, the steps which comprise diluting the spent alkylation sulfuric acid to an acid concentration of 40 to 60%, heating the dilute sulfuric acid to a temperature above the boiling point of water but below the boiling point of the diluted sulfuric acid, blowing with air and steam while maintaining such temperature to form flocculent carbon, separating flocculent carbon, and concentrating

|  | Run No. | | | |
|---|---|---|---|---|
|  | (A) | (B) | (C) | (D) |
| Charge: | | | | |
| i-$C_4H_{10}$, g | 232 | 232 | 232 | 232. |
| i-$C_4H_8$, g | 44.8 | 44.8 | 44.8 | 44.8. |
| $H_2SO_4$, g | 276.8 | 276.8 | 276.8 | 276.8. |
| Reaction times, hrs | 16 | 16 | 16 | 16. |
| Reaction container | Glass-lined horizontal bomb. | Glass-lined horizontal bomb. | Glass-lined horizontal bomb. | Glass-lined horizontal bomb. |
| Method of agitation | Mechanical | Mechanical | Mechanical | Mechanical. |
| Recovery, unreacted, i-$C_4H_{10}$, g | 207.5 | 173.8 | 169.7 | 201.5. |
| Acid, g | 271.1 | 273.3 | 271.9 | 277.4. |
| Hydrocarbon product, g | 38.5 | 52 | 76.2 | 61.1. |
| Product yield, based on i-$C_4H_8$ charged, wt. percent | 85.7 | 116 | 170 | 136.5. |
| Average bromine number of product | 51.7 | 9.4 | 0.1 | 0.8. | the dilute sulfuric acid to 85 to 100% sulfuric acid concentration.

2. In the regeneration of spent alkylation acids, the steps which comprise diluting the spent alkylation sulfuric acid to an acid concentration of 40 to 60%, heating the dilute sulfuric acid to a temperature of 120° to 170° C., blowing with air and steam while maintaining such temperature for from ½ to 2 hours to form flocculent carbon, separating the flocculent carbon, and concentrating the dilute sulfuric acid to 90 to 100% sulfuric acid concentration.

3. In the regeneration of spent alkylation acids, the steps which comprise diluting the spent alkylation sulfuric acid to a sulfuric acid concentration of 40 to 60% by blowing with steam and regulating the heat, heating the dilute sulfuric acid to a temperature of 120° to 170° C., blowing further with air and steam while maintaining such temperature for ½ to 2 hours to form a flocculent carbon, separating the flocculent carbon and concentrating the dilute sulfuric acid to 90 to 100% sulfuric acid concentration.

OBER C. SLOTTERBECK.